United States Patent
Wu

(10) Patent No.: US 11,614,046 B2
(45) Date of Patent: Mar. 28, 2023

(54) INHIBITION DEVICE FOR PREVENTING UNINTENDED ACCELERATION OF A VEHICLE

(71) Applicant: Wen-Yi Wu, New Taipei (TW)

(72) Inventor: Wen-Yi Wu, New Taipei (TW)

( * ) Notice: Subject to any disclaimer, the term of this patent is extended or adjusted under 35 U.S.C. 154(b) by 0 days.

(21) Appl. No.: 17/736,593

(22) Filed: May 4, 2022

(65) Prior Publication Data

US 2022/0260032 A1 Aug. 18, 2022

Related U.S. Application Data

(63) Continuation of application No. 17/213,194, filed on Mar. 25, 2021, now Pat. No. 11,359,571, which is a
(Continued)

(51) Int. Cl.
| | |
|---|---|
| *F02D 41/22* | (2006.01) |
| *F02D 17/04* | (2006.01) |
| *F02D 41/10* | (2006.01) |
| *F02D 41/16* | (2006.01) |
| *F02D 41/04* | (2006.01) |

(52) U.S. Cl.
CPC .............. *F02D 41/22* (2013.01); *F02D 17/04* (2013.01); *F02D 41/045* (2013.01); *F02D 41/10* (2013.01); *F02D 41/16* (2013.01); *F02D 2200/602* (2013.01)

(58) Field of Classification Search
CPC ........ F02D 41/22; F02D 17/04; F02D 41/045; F02D 41/10; F02D 41/16; F02D 2200/602; F02D 41/266; F02D 11/106; F02D 11/105; F02D 29/02; B60K 28/10
See application file for complete search history.

(56) References Cited

U.S. PATENT DOCUMENTS

| | | | |
|---|---|---|---|
| 2,825,418 | A | 3/1958 | Kershman |
| 3,926,275 | A | 12/1975 | Nersesian |
(Continued)

FOREIGN PATENT DOCUMENTS

| | | |
|---|---|---|
| CN | 202345406 U | 7/2012 |
| CN | 106184219 A | 12/2016 |
(Continued)

*Primary Examiner* — Joseph J Dallo
(74) *Attorney, Agent, or Firm* — Leong C. Lei

(57) ABSTRACT

The inhibition device includes a micro-controller configured with a triggering condition including a number of intervals and, for each interval, a corresponding duration and a corresponding threshold. Each interval is a range specifying how much the vehicle's acceleration pedal has changed its position in terms of percentages of a pedal stroke. Each duration specifies the fastest time duration allowable for the acceleration pedal to attain a corresponding interval of pedal position change. The micro-controller converts progress signals of the acceleration pedal to corresponding percentages, obtains a difference DEF between the successive percentages, records a time duration RES between successive progress signals, and calculates DEF/RES=X. When X is greater than or equal to a threshold of a corresponding interval, the micro-controller sends an idle signal to the vehicle's engine control unit or intercepts the progress signals to prevent them from reaching the engine control unit.

8 Claims, 4 Drawing Sheets

Related U.S. Application Data continuation-in-part of application No. 16/705,167, filed on Dec. 5, 2019, now abandoned.

(56) References Cited

U.S. PATENT DOCUMENTS

| | | | |
|---|---|---|---|
| 5,155,682 A | 10/1992 | Ninoyu | |
| 5,553,581 A | 9/1996 | Hirabayashi et al. | |
| 5,902,211 A | 5/1999 | Jones et al. | |
| 6,647,957 B1 | 11/2003 | Cha | |
| 7,183,729 B2 | 2/2007 | De Waele et al. | |
| 7,395,887 B2 | 7/2008 | Viergever et al. | |
| 8,122,843 B2 | 2/2012 | Lindsay et al. | |
| 8,725,393 B2* | 5/2014 | Tsuzuki | F02D 35/024 700/29 |
| 8,730,020 B2* | 5/2014 | Konet | B60Q 5/008 340/384.1 |
| 8,938,079 B2* | 1/2015 | Valeri | G10K 15/02 381/86 |
| 9,227,566 B2* | 1/2016 | Valeri | B60Q 9/00 |
| 9,271,073 B2* | 2/2016 | Valeri | G10K 15/02 |
| 9,328,690 B2* | 5/2016 | Shibata | F02D 41/401 |
| 9,546,629 B2 | 1/2017 | Morinaga et al. | |
| 9,793,870 B1* | 10/2017 | Valeri | H04B 1/3822 |
| 9,849,780 B2 | 12/2017 | Kim | |
| 10,071,686 B2* | 9/2018 | Reilly | B60Q 9/00 |
| 10,140,970 B1* | 11/2018 | Valeri | H03G 3/3005 |
| 10,555,076 B1 | 2/2020 | Valeri et al. | |
| 2004/0108161 A1 | 6/2004 | Ohno | |
| 2005/0015196 A1 | 1/2005 | Hawkins | |
| 2010/0134263 A1 | 6/2010 | Mathony et al. | |
| 2011/0279255 A1 | 11/2011 | Miyoshi | |
| 2013/0196816 A1 | 8/2013 | Natsume | |
| 2015/0016627 A1* | 1/2015 | Barlow, Jr. | G10K 15/04 381/86 |
| 2016/0010735 A1 | 1/2016 | Ohashi et al. | |
| 2016/0368444 A1 | 12/2016 | Kim et al. | |
| 2017/0008526 A1 | 1/2017 | Ko | |
| 2017/0078822 A1* | 3/2017 | Barlow, Jr. | B60Q 5/00 |
| 2017/0337915 A1* | 11/2017 | Valeri | G10K 11/17823 |
| 2018/0179982 A1 | 6/2018 | Botting et al. | |

FOREIGN PATENT DOCUMENTS

| | | |
|---|---|---|
| CN | 107878198 A | 4/2018 |
| KR | 20160093441 A | 8/2016 |

\* cited by examiner

INHIBITION DEVICE FOR PREVENTING UNINTENDED ACCELERATION OF A VEHICLE

CROSS-REFERENCE TO RELATED APPLICATION

This is a continuation of U.S. patent application Ser. No. 17/213,194 filed on Mar. 25, 2021, which is a Continuation-in-part application of Ser. No. 16/705,167, filed Dec. 5, 2019, now abandoned, the entirety of which is incorporated herein by reference in its entirety.

FIELD

The disclosure relates to vehicle driving safety, and more particular to an inhibition device against a driver's accidental pressing the accelerator pedal.

BACKGROUND

CN 202,345,406 for Li et al discloses, in paragraph [0025] of the English translation, which recites the following:

"At the bottom dead center of the moving stroke, a damper 11 is provided between the front end of the sensing element 1 and the accelerator pedal 10 (as shown in FIG. 2), so that the sensing end of the sensing element 1 on the accelerator pedal 10 fully compresses the damper 11". Also, as described in paragraph [0028] of the English translator, the sensing element 11 will be triggered only when the accelerator pedal 10 is pressed heavily to compress the damper 11 to the end. As it is shown in FIG. 2 of Li, the sensing element 1 is arranged at the "bottom dead end" of the moving stroke", and it is apparent that the sensing element 1 will not be triggered in a major portion of the moving stroke. In other words, before the accelerator pedal 10 is moved down to the "bottom dead end" where the sensing element 1 is located, the sensing element 1 will not be triggered. For any cases that unintended acceleration of the vehicle occurs when the accelerator pedal 10 has not yet reach the bottom dead end, the unintended acceleration will not be stopped, because the accelerator pedal 10 does not reach the bottom dead end to trigger the sensing element 1. In other words, Li only discloses to detect whether the accelerator pedal is erroneously pressed down by the driver and whether the movement of the accelerator pedal caused by for example the erroneous press-down reaches the bottom dead end or not.

Furthermore, CN 107,672,542 for Jianghai Automobile Intelligent Technology Co Ltd discloses a mistake step on accelerator of vehicle analysis and control system which basically includes a signal collecting device and a CPU wherein the CPU performs the following processing according to the signal sending from the signal collecting device:

"The instantaneous acceleration signal within the first 30 ms is filtered. If the stroke is increased to 70% and above within 5%, or the stroke is increased to 80% and above within 33%, and the time spent is within 30~160 ms, it is judged that the accelerator has been stepped on by mistake. The control system will output an idle signal and alarm signal."

The disadvantage of this patent is if the driver of the car is used to stepping on the accelerator vigorously when driving, it is very prone to misjudgment.

SUMMARY

Therefore, one of the objectives of the disclosure is to provide an inhibition device for preventing unintended vehicle acceleration.

According to the disclosure, the inhibition device for preventing unintended acceleration is used by a vehicle which comprises a power source, an acceleration pedal that is movable in a complete stroke from a fully released state to a flooring state, an acceleration pedal detector, and an engine control unit. The inhibition device comprises a micro-controller electrically connected to the power source. The micro-controller is also electrically connected to the acceleration pedal detector to receive a plurality of progress signals therefrom. The micro-controller is configured with a triggering condition and a releasing condition. The triggering condition comprises a plurality of intervals and, for each interval, a corresponding duration and a corresponding threshold equal to the corresponding interval divided by the corresponding duration, wherein the intervals are positional ranges of the complete stroke of the acceleration pedal from the fully released state to the flooring state of the acceleration pedal; each interval is a percentage range specifying how much the acceleration pedal has changed its position in terms of percentages of a pedal stroke converted from successive progress signals; each duration specifies the fastest time duration allowable for the acceleration pedal to attain a corresponding interval of acceleration pedal position change. The micro-controller converts the progress signals to corresponding percentages of the pedal stroke, obtains at least a difference DEF between the successive percentages, records at least a time duration RES between successive progress signals, calculates DEF/RES=X, when X is greater than or equal to a threshold corresponding to an interval to which the DEF belongs to, the micro-controller sends an idle signal to the engine control unit, so that the vehicle restores to an idle state. The releasing condition is when the progress signals of the acceleration pedal are reduced to at least 10% of the pedal stroke, where the micro-controller stops the idle signal.

The inhibition device disclosed herein may have an aspect that the positional ranges are defined as 0-30%, 30-60%, and 60-100%.

The inhibition device disclosed herein may have another aspect that each duration is between 1 and 2000 ms.

The inhibition device disclosed herein may further comprise a buzzer connected to the micro-controller, when X is greater than or equal to a threshold corresponding to an interval to which the DEF belongs to, the micro-controller activates the buzzer to issue an audible alarm.

The inhibition device disclosed herein may further comprise a configuration device electrically connected to the micro-controller for setting the intervals and durations.

The inhibition device disclosed herein may further comprise a recorder that records operation statuses of the vehicle's acceleration pedal and brake system.

The inhibition device disclosed herein may have a further aspect that the micro-controller further comprises a wireless transmission element connecting to a big data server.

The inhibition device disclosed herein may further comprise a switch for turning on and off the inhibition device.

BRIEF DESCRIPTION OF THE DRAWINGS

Other features and advantages of the disclosure will become readily apparent to those skilled in the art from the following detailed description of the embodiments in the light of the accompanying drawings, in which.

DETAILED DESCRIPTION

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
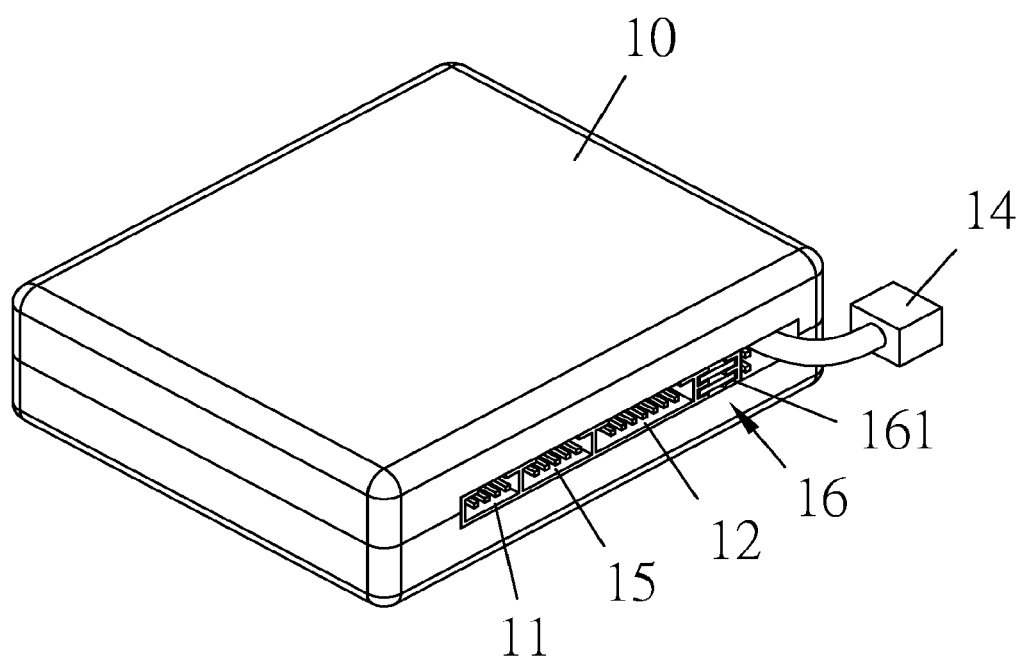
FIG. 1 is a perspective diagram showing an inhibition device according an embodiment of the present invention.
Figure 2:
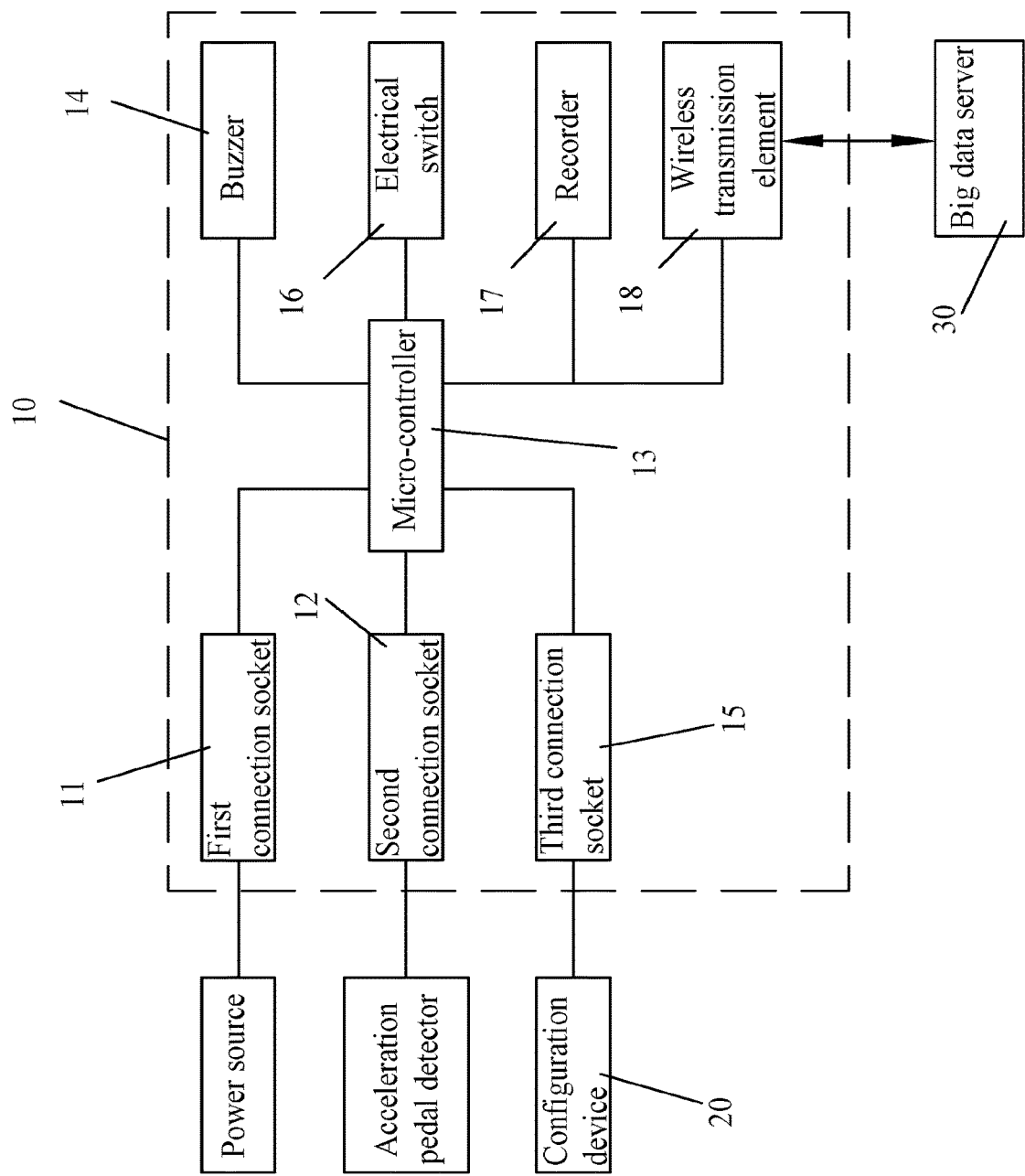
FIG. 2 is a functional block diagram showing the inhibition device of FIG. 1.

As shown in FIGS. 1 and 2, an inhibition device according to an embodiment of the present invention includes the following components. The inhibition device is mainly embodied in a main member 10, which includes a first connection socket 11, a second connection socket 12, a micro-controller or micro control unit (MCU) 13, a buzzer 14, a third connection socket 15, an electrical switch 16, and a recorder 17. The first connection socket 11 is electrically connected to a power source of a vehicle where the inhibition device is installed. The power source of the vehicle includes at least a fuse. The main member 10 may have an aluminum casing, or a plastic casing internally attached with a copper plate, both capable of for shielding electromagnetic waves.

The second connection socket 12 is electrically connected to an acceleration pedal detector of the vehicle and, when the acceleration pedal is engaged and disengaged, a number of progress signals is delivered to the micro-controller 13, in addition to the vehicle's engine control unit (ECU).

The micro-controller 13 is configured with a triggering condition and a releasing condition. The triggering condition is defined by a number of intervals and, for each interval, a corresponding duration. The intervals are a number of ranges reflecting how much acceleration pedal has changed its position in terms of percentages of the pedal's complete stroke from fully release to flooring. In the present embodiment, the intervals defined are 0-30%, 30-60%, and 60-100%, but the present invention is not limited as such.

The 0-30%, 30-60%, and 60-100% intervals mean the pedal position has changed between successive progress signals for an amount that is within 0~30%, 30~60%, and 60~100% of the pedal's complete stroke, reflecting when the acceleration pedal is pressed for a short distance, for a longer distance, or until the acceleration pedal is floored.

Each duration specifies the fastest time duration allowable for a driver to press the acceleration pedal to attain the corresponding interval of pedal position change. In the present embodiment, each duration has a range between 1 and 2000 ms but the present invention is not limited as such.

Figure 3:
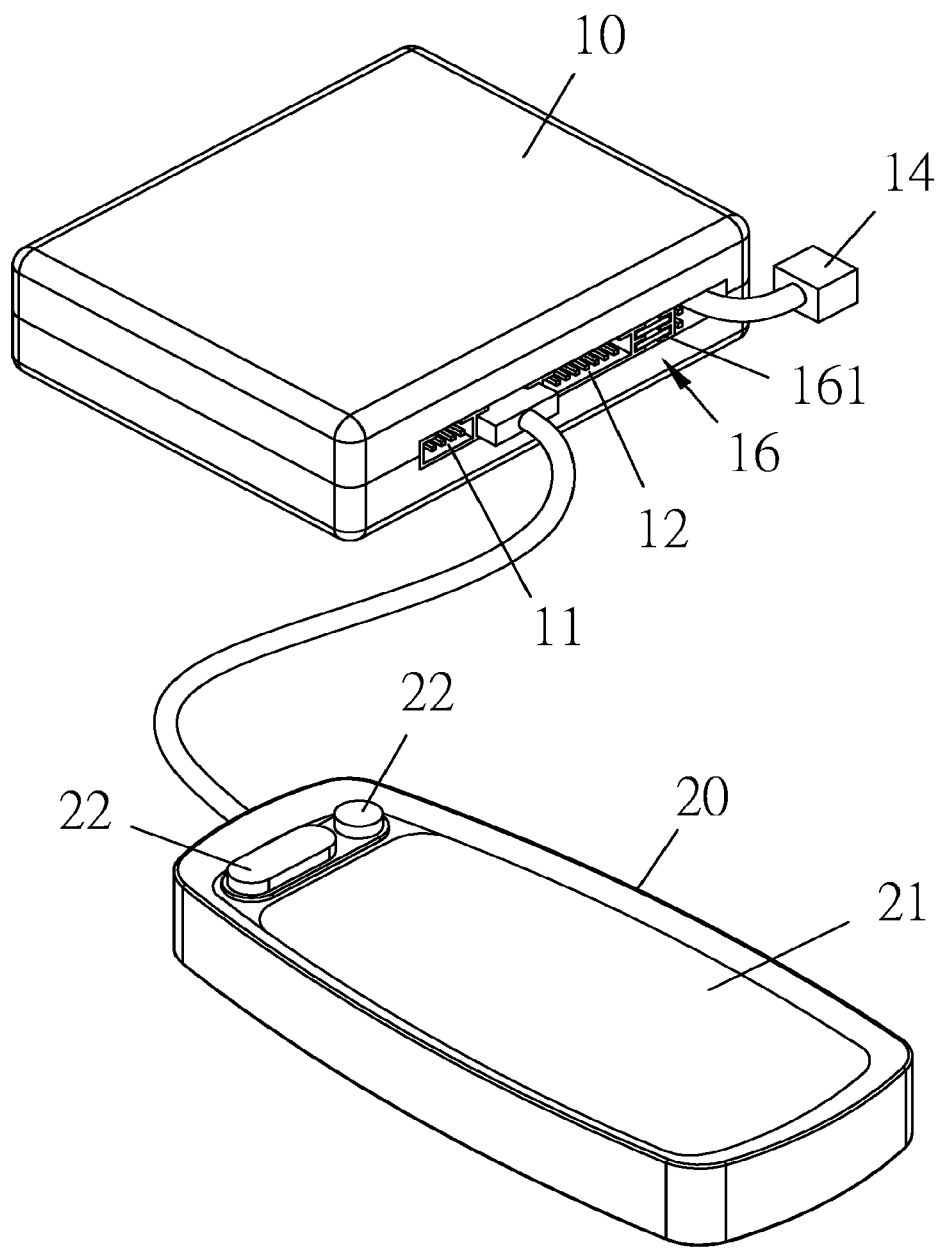
FIG. 3 is a perspective diagram showing the connection of the inhibition device of FIG. 1 to a configuration device.

As shown in FIGS. 2 and 3, the third connection socket 15 is electrically connected to a configuration device 20, which includes a display 21 and a number of control buttons 22 for setting the acceleration pedal interval parameters and the response time parameter.

The electrical switch 16 includes a number of pins and at least a jumper 161 to close, open or bypass some of the pins so as to configure an operation mode of the engine control unit.

The recorder 17 records various data from the vehicle such as the operation statuses of the vehicle's acceleration pedal, brake system. The recording made by the recorder 17 allows examination after an accident occurs so as to and investigate the causes of the accident.

During when the acceleration pedal is pressed, a number of progress signals are produced according to how much the acceleration pedal is pressed, and the progress signals are transmitted to the vehicle's engine control unit (ECU). The engine control unit, accordingly, adjusts the throttle and fuel injector so that gas and air are mixed appropriately and optimal power is delivered by the engine. Therefore, despite that acceleration pedal is accidentally pressed, the engine control unit would still faithfully respond and the engine delivers as usual the corresponding power, causing traffic accident.

The triggering condition of the present invention is therefore equal to each interval divided by its corresponding duration as a threshold. If the progress signals of the acceleration pedal reflect that the pedal's position change falls within a specific interval within an even shorter duration (thereby, exceeding the corresponding threshold), the micro-controller 13 sends an idle signal to the engine control unit (ECU) or the micro-controller 13 intercepts the progress signals so that they do not reach the engine control unit. The vehicle's engine then restores to the idle state. The buzzer 14 is also activated to sound an audible alarm. The unintended acceleration is as such avoided.

The present invention also teaches a related method as follows. Firstly, the micro-controller 13 continuously receives a number of progress signals of the acceleration pedal. The micro-controller 13 converts the progress signals to corresponding percentages of the pedal stroke, and obtains at least a difference DEF between the successive percentages. The micro-controller 13 also records at least a time duration RES between the successive progress signals. The micro-controller 13 then calculates DEF/RES=X. When X is greater than or equal to a threshold corresponding to an interval to which the DEF belongs to, the micro-controller 13 sends an idle signal to the engine control unit, so that the engine of the vehicle restores to the idle state. In the meantime, the buzzer 14 is activated to issue an audible alarm. When the progress signals of the acceleration pedal are reduced to at least 10% of the pedal stoke, the micro-controller 13 stops the idle signal (i.e., the releasing condition).

In other words, the micro-controller 13 continuously monitors the acceleration pedal positions and the times when these positions are reached. The micro-controller 13 then obtains (1) DEF from two successive progress signals, and (2) RES from two successive progress signals. Then, when DEF/RES is greater than or equal to the triggering condition (i.e., the threshold determined by which interval DEF belongs to), the micro-controller 13 sends an idle signal. In such a case, the throttle of the vehicle's engine is closed. The vehicle restores to the idle state. The accidental pressing of the acceleration pedal then will not lead to unintended acceleration.

When the progress signals of the acceleration pedal are reduced to at least 10% of the pedal stroke, the micro-controller 13 stops the idle signal so that the acceleration pedal is restored to function normally.

The micro-controller 13 may further include a wireless transmission element 18 connecting to a big data server 30 for data storage and update.

When the inhibition device fails to function correctly, a user may conduct the following resolution.

1. The user may first check whether all connections are proper and secured. If all connections are normal, the user may check whether the fuse is still operational or replace it with a new one. Usually the inhibition device may be restored in this way after restarting the vehicle.

Figure 4:
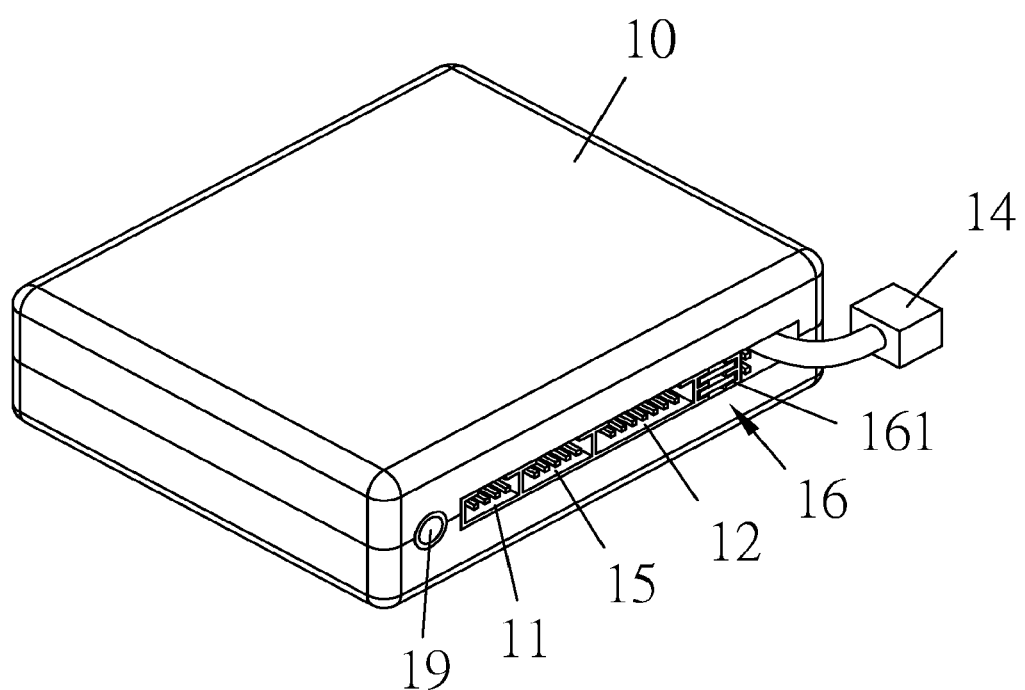
FIG. 4 is a perspective diagram showing an inhibition device according another embodiment of the present invention.

2. As shown in FIG. 4, the main member 10 further include a switch 19. If the inhibition device still cannot be restored after the above procedure, the inhibition device may be turned off (and on) using the switch 19.

3. The user may turn off the vehicle and then turn the ignition (not starting the engine but only turning on the electricity), press the acceleration pedal slowly until it is floored, and hold the pedal for about 2 to 3 minutes. The vehicle will sound one long beep and one short beep, indicating that the inhibition device is turned off.

4. The user then again then turn the ignition (not starting the engine but only turning on the electricity) to restart the inhibition device. The inhibition device will then be back online with default parameters.

To further enhance driving safety, the inhibition device may further include a blind-spot detection system activated after the vehicle is started. The blind-spot detection system employs a 24 GHZ mm-wave radar to provide detection and alert. (1) when there is an object adjacent a lateral side of the vehicle, (2) when the vehicle changes lanes, (3) when there is an object adjacent to the rear of the vehicle, and (4) when a vehicle door is opened.

What is claimed is:

1. An inhibition device for preventing unintended acceleration of a vehicle, where the vehicle comprises a power source, an acceleration pedal that is movable in a complete stroke from a fully released state to a flooring state, an acceleration pedal detector, and an engine control unit, the inhibition device comprising:

a micro-controller electrically connected to the power source;

the micro-controller also electrically connected to the acceleration pedal detector to receive a plurality of progress signals therefrom;

the micro-controller being configured with a triggering condition and a releasing condition;

the triggering condition comprising a plurality of intervals and, for each interval, a corresponding duration and a corresponding threshold equal to the corresponding interval divided by the corresponding duration, wherein the intervals are positional ranges of the complete stroke of the acceleration pedal from the fully released state to the flooring state of the acceleration pedal; each interval is a percentage range specifying how much the acceleration pedal has changed its position in terms of percentages of a pedal stroke converted from successive progress signals; each duration specifies the fastest time duration allowable for the acceleration pedal to attain a corresponding interval of acceleration pedal position change;

the micro-controller converting the progress signals to corresponding percentages of the pedal stroke, obtaining at least a difference DEF between the successive percentages, recording at least a time duration RES between successive progress signals, calculating DEF/RES=X, when X is greater than or equal to a threshold corresponding to an interval to which the DEF belongs to, the micro-controller sends an idle signal to the engine control unit, so that the vehicle restores to an idle state; and the releasing condition being when the progress signals of the acceleration pedal are reduced to at least 10% of the pedal stroke, where the micro-controller stops the idle signal.

2. The inhibition device according to claim 1, wherein the positional ranges are defined as 0-30%, 30-60%, and 60-100%.

3. The inhibition device according to claim 1, wherein each duration is between 1 and 2000 ms.

4. The inhibition device according to claim 1, further comprising a buzzer connected to the micro-controller, when X is greater than or equal to a threshold corresponding to an interval to which the DEF belongs to, the micro-controller activates the buzzer to issue an audible alarm.

5. The inhibition device according to claim 1, further comprising a configuration device electrically connected to the micro-controller for setting the intervals and durations.

6. The inhibition device according to claim 1, further comprising a recorder that records operation statuses of the vehicle's acceleration pedal and brake system.

7. The inhibition device according to claim 1, wherein the micro-controller further comprises a wireless transmission element connecting to a big data server.

8. The inhibition device according to claim 1, further comprising a switch for turning on and off the inhibition device.

* * * * *